United States Patent [19]

Wojciehowski et al.

[11] 4,175,701

[45] Nov. 27, 1979

[54] AIRCRAFT SPRAYING SYSTEM AND METHOD

[75] Inventors: James P. Wojciehowski; John D. Sullivan, both of Phoenix, Ariz.

[73] Assignee: The Garrett Corporation, Los Angeles, Calif.

[21] Appl. No.: 905,711

[22] Filed: May 15, 1978

[51] Int. Cl.² ............................................. B05B 17/02
[52] U.S. Cl. ........................................ 239/11; 239/171
[58] Field of Search .................... 239/127, 11, 171; 244/136

[56] References Cited

U.S. PATENT DOCUMENTS

| | | | |
|---|---|---|---|
| 2,924,040 | 2/1960 | White et al. | 239/171 |
| 3,061,247 | 10/1962 | Hyde | 244/136 |
| 3,351,305 | 11/1967 | Warner | 244/136 |
| 3,362,643 | 1/1968 | Larson et al. | 239/169 |
| 3,455,511 | 7/1969 | Fedorenko | 239/171 |
| 3,494,423 | 2/1970 | Stansbury et al. | 239/171 X |
| 3,547,000 | 12/1970 | Haberkorn et al. | 244/136 X |
| 3,604,509 | 9/1971 | Sachnik | 239/171 X |
| 3,774,871 | 11/1973 | Semmes et al. | 239/171 |

*Primary Examiner*—John J. Love
*Attorney, Agent, or Firm*—James W. McFarland; Albert J. Miller

[57] ABSTRACT

An aircraft spraying system and method drives a turbine motor by pressurized bleed airflow from the working cycle of a turbomachinery-type propulsion engine driving the aircraft, and a control system regulates the pressure of bleed air flow to the motor to vary the rate of liquid distributed from the aircraft.

18 Claims, 2 Drawing Figures

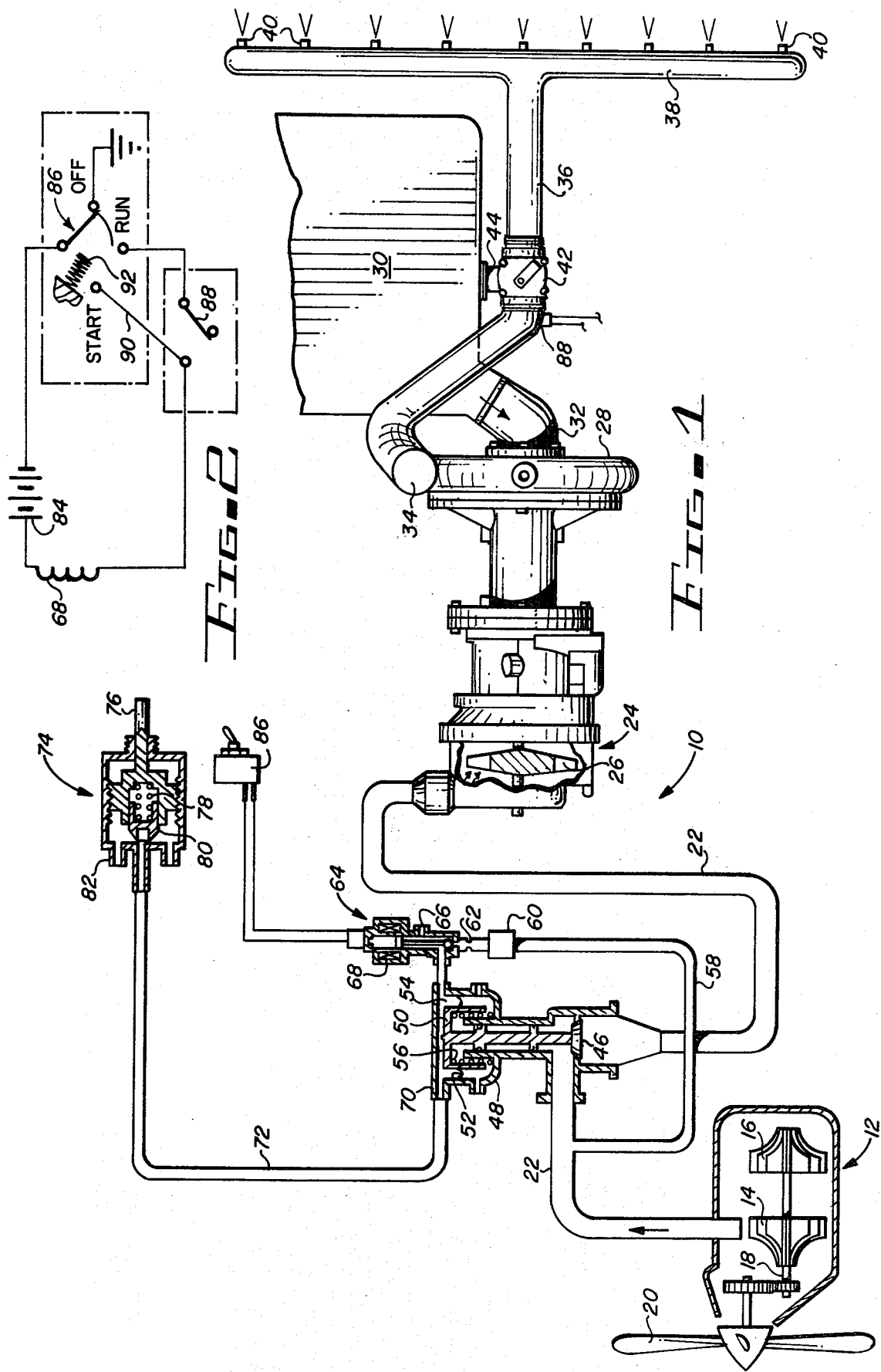

AIRCRAFT SPRAYING SYSTEM AND METHOD

BACKGROUND OF THE INVENTION

This invention relates to apparatus and method for spraying liquid from an aircraft such as utilized in agricultural aircraft for spraying fields and for fire fighting purposes.

Characteristically such aircraft demand high horsepower to perform the various close manueverings associated with agricultural spraying or fire fighting. It is thus important that the power required for spraying of the liquid not place a significant parasitic load on the engine. Certain prior art has attempted to solve this problem by developing the power for the liquid spraying system independent of the engines through a propeller or fan separately exposed to the surrounding airstream. Such a propeller does of course induce a continuous drag on the aircraft and thus must still be carefully designed, etc. to minimize drag. Also, limited control of the spraying system results, and/or significant complication is introduced into its control system, since this powering system is totally dependent upon the airstream flowing past the aircraft and is variable with aircraft air speed. Examples of such types of liquid spraying systems may be found in U.S. Pat. Nos. 2,924,040; 3,061,247; 3,351,305; and 3,455,511.

Another concept for aircraft liquid spraying system centers around utilization of a compressed air source directly or indirectly provided by the aircraft propulsion engine. The compressed air is fed to an accumulator-type reservoir for liquid to be sprayed, the air pressure directly forcing the liquid through the nozzle spray system. The potential energy storage characteristics of such an accumulator tends to reduce the peak power drained from the propulsion engine. However, significantly limited controllability of the liquid being sprayed is evident in such systems. Examples of this type of spraying system may be found in U.S. Pat. Nos. 3,494,423; and 3,774,871. Other less pertinent spraying systems may be found in U.S. Pat. Nos. 3,547,000 and 3,362,643.

SUMMARY OF THE INVENTION

It is an important object of the present invention to provide an improved method and apparatus for spraying liquid from an aircraft which is highly efficient in operation in order to minimize parasitic loads upon the aircraft propulsion engine, yet which also provides a greatly improved controllability for the liquid being sprayed.

It is an important object to provide such an improved liquid spraying apparatus and system which bleeds a flow of pressurized air from the working cycle of a turbomachinery type of propulsion engine carried on the aircraft, the bleed air flow driving a variable speed air turbine motor directly interconnected with a centrifugal-type liquid pump which delivers pressurized liquid flow for spraying nozzles on the aircraft. Bleed air flow to the air turbine motor is regulated both to minimize the parasitic load on the aircraft as well as to provide excellent controllability of the rate of spray of liquid from the nozzles.

Another important object is to provide such an improved liquid spraying system which permits precise manual control of a liquid being sprayed through use of a pneumatically operated pressure regulating valve in the bleed air duct delivering pressurized flow to the air turbine motor, the pneumatic valve being manually controlled to adjust the speeds of the motor and pump to regulate the rate of spraying.

These and other objects and advantages of the present invention are specifically set forth in or will become apparent from the following detailed description of a preferred embodiment of the invention when read in conjunction with the accompanying drawing.

BRIEF DESCRIPTION OF THE DRAWING

FIG. 1 is a partially schematic, partially cross-sectional representation of an aircraft liquid spraying system as contemplated by the present invention; and FIG. 2 is a schematic diagram of the electric control circuitry utilized in the liquid spraying system.

DETAILED DESCRIPTION OF THE PREFERRED EMBODIMENT

Referring now more particularly to the drawing, an aircraft liquid spraying system generally denoted by the numeral 10 is incorporated within an aircraft (not shown) which is propelled or driven by a turbomachinery-type propulsion engine 12. The engine 12 schematically illustrated in FIG. 1 is a turboprop-type engine having a compressor 14 for developing a pressurized air flow within the working cycle of the engine which is then heated through a combustor (not illustrated) prior to driving a turbine 16. Propulsion power is extracted through a shaft 18 driving the propeller 20 for a fixed wing aircraft. Alternately, the turbomachinery-type engine may be a turboshaft-type engine which provides shaft power for driving the rotor of a rotary winged aircraft, or may be another type of turbomachinery engine. In any case the important aspect with respect to the present invention is that the turbomachinery engine develops a pressurized airflow within its working cycle.

The liquid spraying system includes bleed air duct means 22 for bleeding a portion of the pressurized airflow from the working cycle of engine 12 and delivering this flow of pressurized air to a pneumatic motor which may be in the form of an axial flow air turbine-type motor 24 illustrated. Motor 24 includes an axial flow turbine 26 driven by the pressurized airflow. Through an appropriate gear reduction transmission incorporated with the motor 24, the rotary mechanical power developed by the motor directly drives a centrifugal-type liquid pump 28. The motor, pump and transmission may be provided within an integral housing located at a location spaced from the engine 12 at a convenient position on the aircraft.

Liquid to be sprayed from the aircraft is carried within a reservoir 30 which feeds an inlet port 32 of the centrifugal pump. Pressurized liquid flow is delivered from the pump through an outlet port 34 to a delivery duct 36 leading to nozzle means on the aircraft in the form of a spray boom 38 having one or more liquid nozzles 40 therein. Preferably spray boom 38 is disposed at a location on the aircraft remote from the motor-pump combination. A diverter valve 42 in delivery duct 36 along with a return duct 44 leading back to reservoir may be incorporated so that by manual actuation of diverter valve 42 the entire pressurized liquid flow in delivery duct 36 may bypass spray boom 38 and return to the reservoir.

The liquid spraying apparatus further includes regulating means including a pneumatically operated poppet valve 46 interposed in bleed air duct 22 and shiftable downwardly from the closed position illustrated wherein poppet valve 46 completely interrupts pressurized bleed airflow from the engine to motor 24, to various open positions for regulating the flow rate and pressure of bleed air delivered to motor 24. Modulation of the position of control valve of poppet valve 46 controls the speed of rotation of motor 24 and thus the speed of pump 28 to regulate the rate of flow of liquid being exhausted through nozzles 40. A pressure regulating actuator for modulating the position of poppet valve 46 includes a housing 48 and a piston 50 including diaphragm 52 traversing the housing to define a pressure chamber 54. A biasing spring 56 acts against piston 50 which is interconnected with poppet 46 to urge poppet 46 upwardly to the closed position illustrated. A control conduit 58 leads from the bleed air duct 22 upstream of poppet 46 to pressure chamber 54 to develop pressure therewithin to counteract the force of spring 56 as well as the force of pressure downstream of poppet valve 46 acting thereon in an upward direction. Interposed in conduit 58 is a filter 60, a flow limiting orifice 62, and an electrical solenoid operated shutoff valve 64 which is spring biased to the closed position illustrated interrupting communication of conduit 58 with chamber 54 while connecting the chamber 54 with an exhaust 66, and is shiftable upwardly in response to energization of a coil 68 to an open position communicating pressure flow from conduit 58 to chamber 54 while closing communication between exhaust 66 and chamber 54.

Associated with pressure chamber 54 is an exhaust duct 70 communicating with a conduit 72 extending to a manually adjustable variable orifice 74 which includes a manual actuator 76 preferably located in a readily accessible location to the aircraft operator in the cockpit of the craft and thus at a location spaced both from the motor pump assembly as well as the spray boom 38. The structure of the pressure selector 74 illustrated includes the rotary actuator member 76 which adjusts the tension of a spring 78 exerting a preload on a poppet 80 defining a variably sized orifice, dependent on the preload, between conduit 72 and one or more exhaust ports 82. The variable orifice of pressure selector 74, being in series of the upstream orifice 62 in conduit 58, allows precise regulation of pressure in chamber 54 by rotation of actuator 76 to thus modulate the position of valve 46.

The regulating control further includes an electrical control circuit with one pole of a source of electrical power such as battery 84 directly connected with coil 68 of the shutoff valve, a three-position manually operated switch 86, and a pressure sensitive electrical switch 88 that is operably associated with delivery duct 36 to be responsive to the pressure of liquid being delivered to the spray boom. Switch 88 is preselected so as to move from its open position illustrated in FIG. 2 to a closed position whenever pressure of liquid in delivery duct 36 exceeds a preselected level. In its "off" position illustrated in FIG. 2, switch 86 breaks connection between the other pole of battery 84 and coil 68 to de-energize the shutoff valve and hold control valve 46 in the closed position illustrated. Switch 86 is selectively rotated clockwise to its extreme-most "start" position to contact conductor 90 and directly connect the other battery pole with the solenoid to energize the latter and thus port pressurized fluid to chamber 54 to open poppet valve 46. Upon release of switch 86, a spring return 92 moves switch 86 automatically counter-clockwise back from the start position to a "run" position to connect the solenoid and pressure switch 88 in series with the battery 84. Thus, in the "run" position the circuit between the battery and solenoid to energize the latter is completed only when pressure in the delivery duct 36 exceeds the preselected level to close switch 88. Similarly, it will be apparent that during normal operation of the system with switch 86 in its center "run" position, the solenoid will automatically be de-energized to interrupt flow of pressurized air to the turbine motor whenever the pressure of liquid in delivery duct 36 drops below the preselected level.

In operation, the liquid spraying apparatus is initiated by shifting switch 86 to its start position to energize solenoid 68 and open the shutoff valve 64 to develop pressure within chamber 54. Poppet valve 46 moves to an open position permitting pressurized airflow to drive motor 24 and thus the pump 28. Pressure in delivery duct 36 will quickly rise above the preselected level to close switch 88 permitting the operator to release switch 86 to allow spring 92 to return to its run position wherein solenoid 68 remains energized. The aircraft operator then adjusts the rate of liquid being sprayed from the spray boom 38 by rotating actuator 76 to adjust the pressure maintained in chamber 54 as discussed in detail previously. In this manner pressure selector 74 controls the pressure of bleed air flow delivered to turbine motor 24 to control the speed of rotation of the motor and pump and thereby control the rate of liquid exhaust through the spray boom.

For instantaneous shutoff of the liquid being sprayed from boom 38, diverter valve 42 can be manually rotated to its position returning all liquid flow in delivery duct 36 back through return duct 44 to reservoir 30. In the instance of depletion of the liquid in reservoir 30, pressure in delivery duct 36 drops below the preselected level to open switch 88 and de-energize solenoid 68 to shift shutoff valve 66 to its closed position. Immediately, poppet valve 46 also moves to its closed position under the urgings of spring 56 to interrupt continued parasitic flow of bleed air from the working cycle of the engine. System shutdown is manually accomplished by rotating switch 86 to its off position illustrated in FIG. 2 to de-energize solenoid 68.

In this manner the regulating means controls the flow of pressurized air being bled from the working cycle of the engine so as to minimize this bleed flow while still allowing complete, accurate and reliable control of the liquid being sprayed from the aircraft. Only power as needed, and no more than needed, is drained from the engine, and even in the instance of inadvertence by the aircraft operator, the spray system automatically shuts down upon depletion of the liquid to be sprayed to minimize parasitic load on the engine.

Thus, the present invention provides an improved method for spraying liquid from an aircraft which is propelled by turbo-machinery-type engine 12 that develops a pressurized airflow in its working cycle, which method includes the steps of bleeding pressurized airflow from the working cycle and driving a pneumatic motor with this airflow; then mechanically driving a liquid pump by the motor to develop the pressurized liquid flow which is then exhausted through a nozzle on the aircraft; and regulating the flow of bleed air to the motor to control the rate of liquid exhausted. Regulation is accomplished by energizing and de-energizing an electropneumatic valve 64 to start and stop the system; modulating the position of the pneumatically operated poppet valve 46 to regulate bleed air flow pressure when valve 64 is energized; and by sensing liquid flow pressure and de-energizing valve 64 whenever the liquid pressure drops below a preselected level.

Various modifications and alterations will be apparent to those skilled in the art. Accordingly, the foregoing detailed description of a preferred embodiment of the invention should be considered exemplary in nature and not as limiting to the scope and spirit of the invention as set forth in the appended claims.

Having described the invention with sufficient clarity that those skilled in the art may make and use it, we claim:

1. For use in an aircraft propelled by a turbomachinery engine developing a pressurized airflow in the working cycle thereof, apparatus for controllably spraying a liquid from the aircraft comprising:
   a bleed air duct communicating with said engine for bleeding a flow of pressurized bleed air from said working cycle;
   an axial flow air turbine motor communicating with said bleed air duct to be driven at selectively variable speeds by said bleed air;
   a poppet valve interposed in said bleed air duct shiftable away from a closed position blocking bleed air flow therethrough to variably open positions regulating the pressure of said flow of bleed air delivered to said motor to vary the speed thereof, said valve arranged whereby pressure of bleed air in said bleed air duct downstream of said valve urges the latter toward said closed position;
   an actuator for said poppet valve including a housing and a piston movable therein to define a pressure chamber having an exhaust port, said piston coupled with said poppet valve to actuate the latter, said actuator including a spring biasing said piston to move in a direction shifting said poppet valve to said closed position;
   a conduit communicating said pressure chamber with said bleed air duct at a location upstream of said poppet valve;
   an electrically operated solenoid shut off valve interposed in said conduit and having de-energized closed and energized open positions respectfully blocking and permitting pressure fluid communication between said bleed air duct and said pressure chamber;
   a manually adjustable variable orifice controlling flow through said exhaust port of the pressure chamber to regulate pressure maintained therewithin when said shut off valve is energized to its open position, whereby said variable orifice selectively adjusts said pressure of bleed air delivered to said motor and thus the speed of said motor;
   a reservoir on said aircraft for liquid to be sprayed;
   a variable speed centrifugal pump having an inlet port receiving liquid from said reservoir, said pump operably connected to be mechanically driven by said motor at a speed proportionate to said motor speed, said pump having an outlet port for pressurized liquid flow from said pump;
   a delivery duct for receiving said pressurized liquid flow from said outlet port;
   a spray boom mounted on said aircraft and having a plurality of spray nozzles, said boom receiving said pressurized liquid flow from said delivery duct whereby liquid is sprayed from said nozzles at a rate selectively variable by adjustment of said variable orifice to vary said speed of the pump and the pressure of liquid delivered to said boom;
   a bypass duct extending from said delivery duct to said reservoir;
   a diverter valve in said delivery duct for selectively diverting said pressurized liquid flow in said delivery duct to said bypass duct;
   a pressure sensitive electrical switch operably associated with said delivery duct upstream of said diverter valve, said pressure sensitive switch automatically shiftably between circuit closing and circuit opening positions whenever pressure of said liquid is respectively above and below a preselected pressure; and
   electric circuit means associated with said solenoid operated shut off valve and said pressure sensitive switch, including a source of electrical power and a three position switch shiftable between an off position breaking connection between said source and said shut off valve, a start position directly connecting said source and said shut off valve, and a run position connecting said shut off valve and said pressure sensitive switch in series with said source.

2. Liquid spraying apparatus for use with an aircraft powered by a turbomachinery-type heat engine characterized by the development of a pressurized airflow in the working cycle thereof, said apparatus comprising: an air turbine motor; bleed air duct means for delivering a flow of pressurized bleed air from said working cycle of the engine to said motor to drive the latter; electropneumatic regulating means operably associated with said bleed air duct means for regulating the pressure of said flow of bleed air to said motor to control the speed of said motor; a reservoir for liquid to be sprayed; a liquid centrifugal pump for receiving liquid from said reservoir and discharging a pressurized liquid flow from said pump; and nozzle means receiving said pressurized liquid flow for spraying said liquid from the aircraft at a rate related to the speed of said pump, said pump mechanically driven by said motor whereby said regulating means are operable to regulate said rate of spray of liquid discharged through said nozzle means.

3. Apparatus for spraying liquid from an aircraft having a turbomachinery-type propulsion engine developing a pressurized airflow in its working cycle, comprising:
   duct means communicating with said engine for bleeding a flow of pressurized bleed air from said working cycle;
   a pneumatic motor receiving said flow of bleed air from said duct means and driven thereby at a speed related to said flow of bleed air;
   a reservoir on the aircraft for liquid to be sprayed;
   a liquid pump mechanically driven by said motor at a variable speed proportionate to motor speed, said pump having an inlet port communicating with said reservoir and an outlet port for pressurized liquid flow from said pump;
   nozzle means communicating with said outlet port for spraying said pressurized liquid flow from the aircraft; and
   regulating means operably associated with said duct means for regulating said flow of bleed air to the motor to control said speed of the motor and pump and thereby control the rate of pressurized liquid flow through said nozzle means.

4. In an aircraft, apparatus comprising:

a turbomachinery-type engine for propelling the aircraft, said engine developing an internal pressurized airflow in the working cycle thereof;

a pneumatic motor carried on the aircraft at a first location remote from said engine;

bleed air duct means extending between said engine and said motor for delivering a portion of said pressurized airflow in said working cycle to drive said motor;

a reservoir on the aircraft for liquid to be sprayed from the aircraft;

a centrifugal liquid pump mechanically driven by said motor at a speed related to the speed of said motor, said pump having an inlet port receiving low pressure liquid from said reservoir and an outlet port for pressurized liquid flow from said pump;

nozzle means carried on the aircraft at a second location remote from said first location for spraying said liquid from the aircraft;

a delivery duct extending between said pump outlet port and said nozzle means to deliver said pressurized liquid flow for exhaust from said aircraft through said nozzle means at a rate dependent upon the speed of said pump; and regulating means operably associated with said bleed air duct means for regulating the flow of said portion of the pressurized airflow to said motor to control said speeds of the motor and pump and thereby regulate said rate of exhaust of pressurized liquid through said nozzle means.

5. In an aircraft as set forth in claim 4, wherein said regulating means includes a manually adjustable member for selectively regulating said flow of the portion of the pressurized airflow to the motor, said manually adjustable member disposed at a third location readily accessible to the aircraft operator and remote from said first and second locations.

6. Apparatus as set forth in claim 3 or 4, wherein said motor is an air turbine motor and said liquid pump is a centrifugal liquid pump.

7. Apparatus as set forth in claim 6, wherein said nozzle means comprises a spray boom having a plurality of nozzles therein.

8. Apparatus as set forth in claim 2, 3, or 4, wherein said regulating means includes a pneumatically operated control valve disposed in said duct means and having a closed position interrupting said flow of bleed air to said motor, said control valve shiftable to open positions for modulating the pressure of said flow of bleed air to the motor to regulate said speed of the motor.

9. Apparatus as set forth in claim 8, wherein said pneumatically operated control valve is a poppet valve.

10. Apparatus as set forth in claim 9, wherein said regulating means further includes an actuator for said poppet valve including a housing and a piston movable therein to define a pressure chamber having an exhaust port, said piston coupled with said poppet valve to actuate the latter, said actuator including a spring biasing said piston to move in a direction shifting said poppet valve to said closed position.

11. Apparatus as set forth in claim 10, wherein said regulating means further includes a conduit communicating said pressure chamber with said duct means at a location upstream of said poppet valve, and an electrically operated solenoid shut off valve interposed in said conduit and having de-energized closed and energized open positions respectively blocking and permitting pressure fluid flow to said pressure chamber.

12. Apparatus as set forth in claim 11, wherein said regulating means further includes a manually adjustable variable orifice controlling flow through said exhaust port of the pressure chamber to regulate pressure maintained therewithin when said shut off valve is energized to its open position, whereby said variable orifice selectively adjusts said pressure of bleed air delivered to said motor and thus the speed of said motor.

13. Apparatus as set forth in claim 11, wherein said regulating means further includes a pressure sensitive electrical switch responsive to the pressure of said pressurized liquid flow from said pump and shiftable between circuit closing and circuit opening positions whenever said pressure of the liquid is respectively above and below a preselected level.

14. Apparatus as set forth in claim 13, wherein said regulating means further includes electric circuit means associated with said solenoid operated shut off valve and said pressure sensitive switch, including a source of electrical power and a three-position switch shiftable between an off position breaking connection between said source and said shut off valve, a start position directly connecting said source and said shut off valve, and a run position connecting said shut off valve and said pressure sensitive switch in series with said source.

15. A method of spraying liquid from an aircraft propelled by a turbomachinery engine developing a pressurized airflow in its working cycle, comprising the steps of bleeding a flow of pressurized air from the working cycle; driving a pneumatic motor by the flow of bleed air; mechanically driving a liquid pump by the motor to produce a pressurized liquid flow exhausted through a nozzle; and regulating the flow of bleed air to the motor to control the rate of liquid exhaust through the nozzle.

16. A method as set forth in claim 15, wherein said regulating step includes energizing and de-energizing an electrically operated valve for respectively allowing and interrupting the flow of bleed air to the motor.

17. A method as set forth in claim 16, wherein said regulating step further includes modulating the position of a pneumatically operated valve when said electrically operated valve is energized to regulate the pressure of said flow of bleed air delivered to the motor.

18. A method as set forth in claims 16 or 17, wherein said regulating step further includes sensing the pressure of said liquid flow delivered to the nozzle, and automatically de-energizing said electrically operated valve whenever said sensed pressure drops below a preselected level.

* * * * *